United States Patent [19]

Burkett et al.

[11] 4,075,675

[45] Feb. 21, 1978

[54] GROUND CONDUCTOR MONITORING SYSTEM AND METHOD

[75] Inventors: Joseph C. Burkett, Bramwell; Harry L. Harshbarger, Bluefield, both of W. Va.

[73] Assignee: Genoa Coal Company, Gary, W. Va.

[21] Appl. No.: 688,553

[22] Filed: May 21, 1976
(Under 37 CFR 1.47)

Related U.S. Application Data

[63] Continuation-in-part of Ser. No. 557,901, March 13, 1975, abandoned, which is a continuation-in-part of Ser. No. 431,325, Dec. 28, 1973, abandoned.

[51] Int. Cl.$^2$ ............................................. H02H 1/02
[52] U.S. Cl. ..................................... 361/48; 361/113; 340/256; 324/51
[58] Field of Search ............... 317/18 C, 18 B, 18 R, 317/45, 28 R, 53; 324/51; 340/256

[56] References Cited

U.S. PATENT DOCUMENTS

| 3,387,064 | 6/1968 | Joy et al. | 340/256 X |
|---|---|---|---|
| 3,633,199 | 1/1972 | Curry et al. | 340/256 X |
| 3,676,739 | 7/1972 | Neuhouser | 317/18 C |
| 3,697,808 | 10/1972 | Lee | 317/18 B X |
| 3,728,582 | 4/1973 | Agnew | 317/18 C |
| 3,729,653 | 4/1973 | Mankoff et al. | 317/18 C |
| 3,761,832 | 9/1973 | Blattenberger | 330/35 |
| 3,895,264 | 7/1975 | Kirilloff | 317/18 B X |

Primary Examiner—J D Miller
Assistant Examiner—Patrick R. Salce
Attorney, Agent, or Firm—Cushman, Darby & Cushman

[57] ABSTRACT

A system and method for monitoring the continuity of a ground conductor in a power transmission system. A plurality of power transmission cables extend between a power source and a load and include a ground conductor extending between the source and the load. The monitoring system includes a transmitter for transmitting a signal within the audio range over the ground conductor. A receiver receives the signal from the transmitter over the ground conductor. The receiver has associated therewith an alarm device and/or a circuit breaker. In response to the absence of the signal at the receiver which would correspond to an interruption in the ground conductor, the circuit breaker is opened to disconnect the power source from the load. Both the receiver and transmitter are coupled to the ground conductor through closed inductive systems comprising toroids.

6 Claims, 6 Drawing Figures

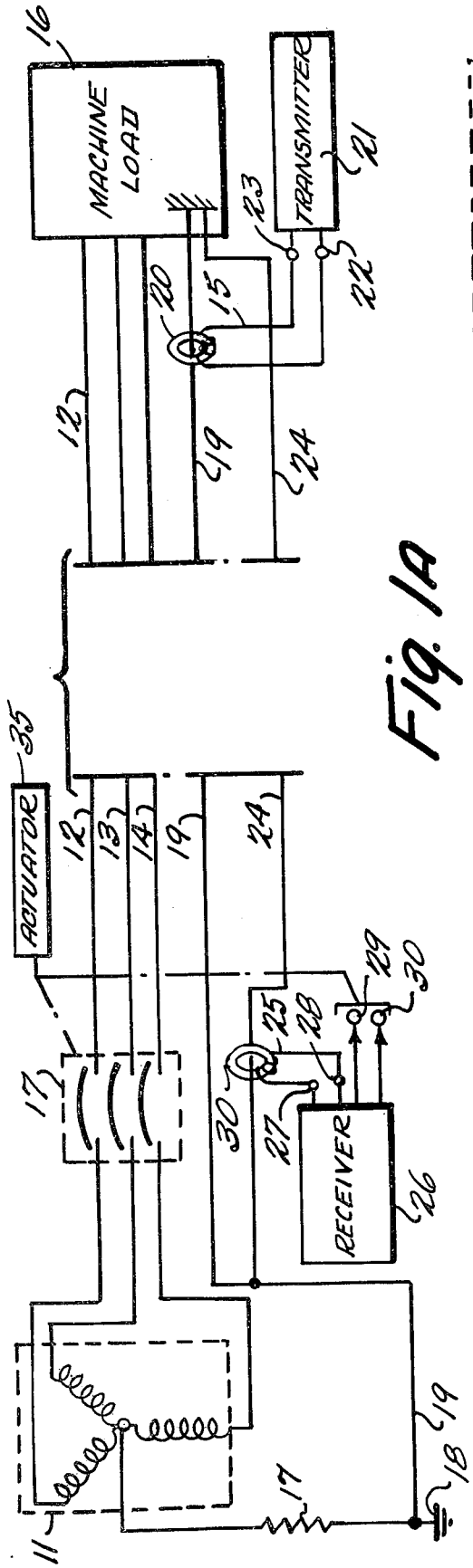
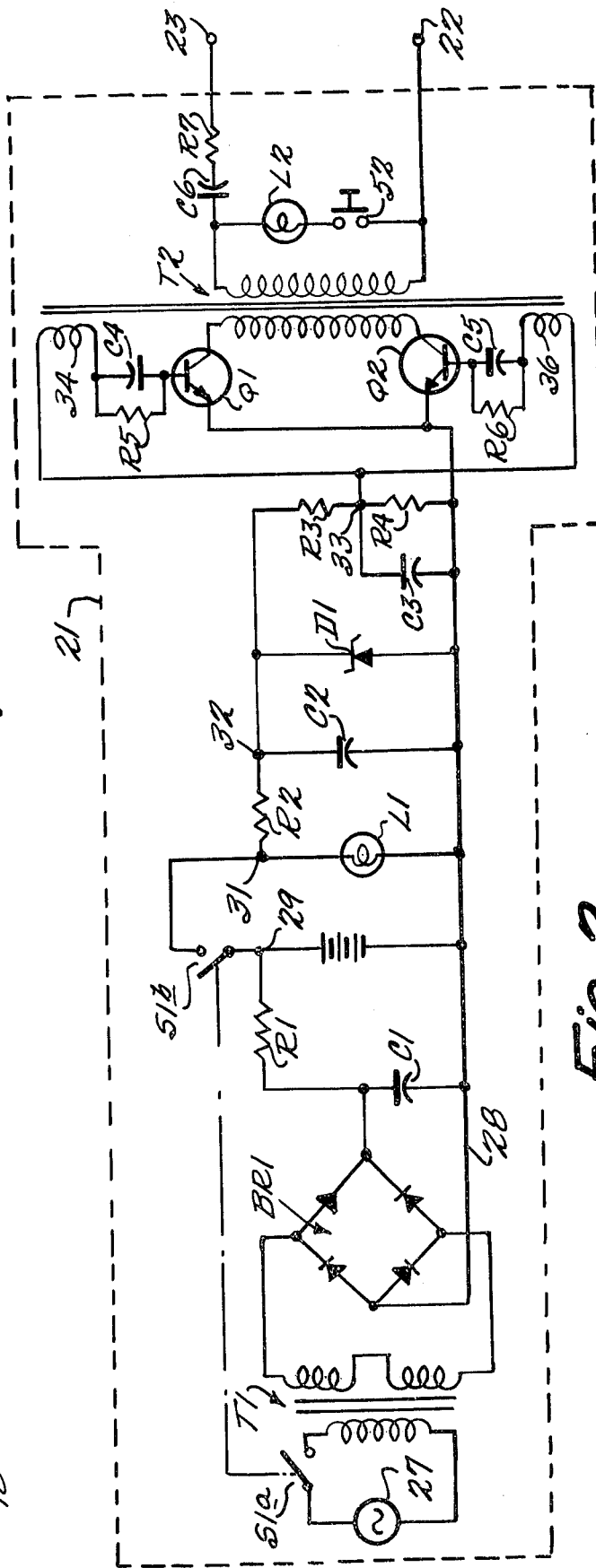
Fig. 1a
Fig. 2

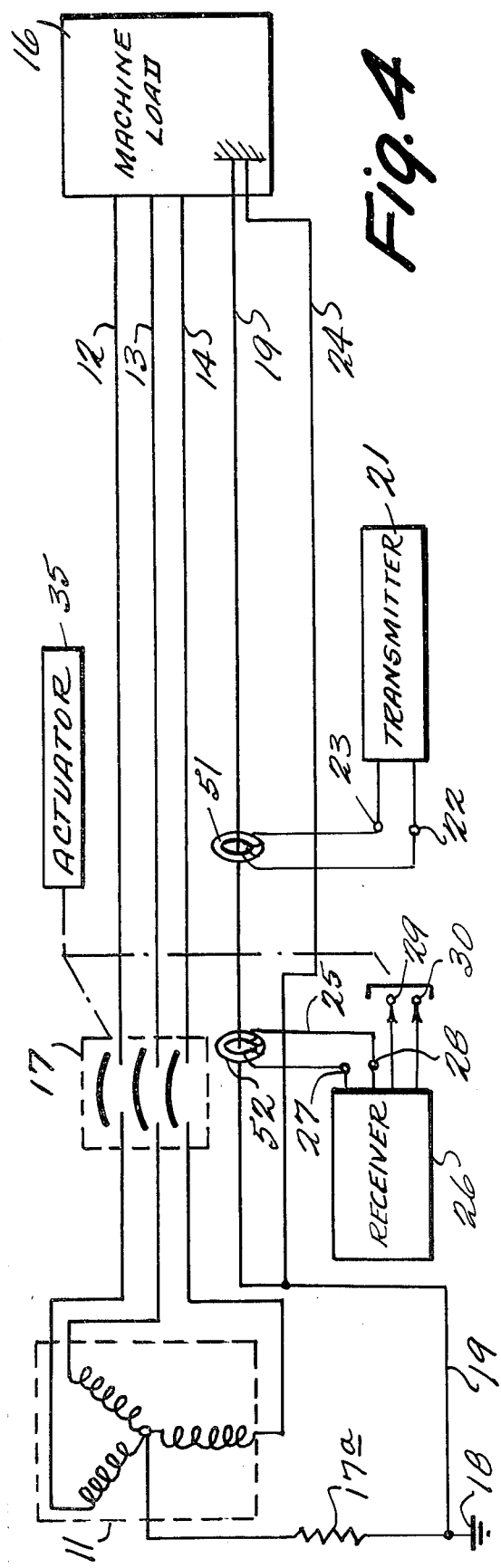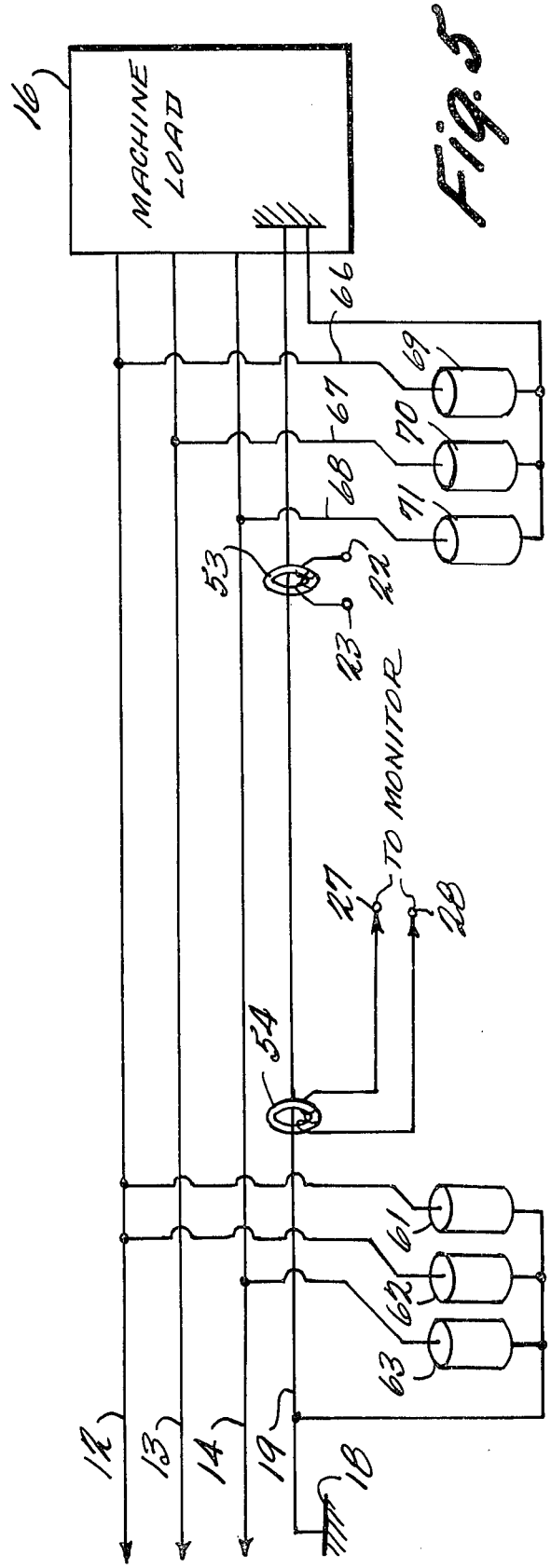

4,075,675

GROUND CONDUCTOR MONITORING SYSTEM AND METHOD

CROSS REFERENCES TO RELATED APPLICATIONS

This is a continuation-in-part of application Ser. No. 557,901, filed Mar. 13, 1975 which in turn is a continuation-in-part of application Ser. No. 431,325, filed Dec. 28, 1973; both now abandoned.

BACKGROUND OF THE INVENTION

This invention pertains to a ground conductor monitoring system and method and, in particular, to a monitoring system for monitoring the ground conductor continuity in a power transmission system.

In electrical power transmission systems, a physical earth ground conductor suitably grounded at the power source, as by means of a grid buried in the earth, for example, is run along with the power cables to a load. In many applications of power transmission systems, such as a system extending into a mine for providing power to the various machines in the mine, it is quite important to insure at all times the continuity of the ground conductor so as to prevent an electrical shock hazard to persons in the mine operating the various machines. There is therefore a need for a system and method for insuring the continuity of such a ground conductor. Some techniques already exist in the prior art for monitoring ground conductor continuity. In accordance with such prior art techniques, DC signals have been coupled over such a ground conductor from the load to the source with monitoring means of an appropriate kind provided adjacent the power source and responsive to the absence of the DC voltage on the ground conductor (indicative of a break in its electrical continuity, for example) to actuate an alarm or trip a breaker. Typically, such DC signals have been on the order of 90 volts with currents as much as 5 amperes.

In addition to the obvious disadvantage of these DC systems requiring large amounts of power and placing a relatively high voltage on the ground conductor, they have also been subject to the disadvantage of not providing completely reliable monitoring. That is, in some instances there could be a break or discontinuity in the ground conductor which the monitoring system did not recognize as such. This is due to the fact that the earth has a relatively low resistance to DC signals, which can be on the order of a few ohms. This is particularly the case for portions of the earth which may contain certain kinds of mineral deposits. Thus, there might be a break in the ground conductor with an alternate path for the DC signal being established from the load through the earth to the earth grid and then to the receiver monitoring unit. Some AC systems are also subject to the possibility of alternate paths being established through the earth.

Other systems including some AC systems have been proposed which involve connecting equipment or circuit devices such as relays in series with the ground conductor being monitored. A serious disadvantage of such a system is that connecting these devices in series in the ground line can potentially destroy the integrity of the ground line. Thus if an electronic component, such as a diode or relay coil, which is connected in series with the ground line malfunctions, the integrity of the ground line itself can be destroyed. Thus an unsatisfactory situation is presented where devices intended to monitor the integrity of a ground line are themselves potentially capable of destroying the ground line's integrity.

Additionally, various of the prior art systems have also been subject to a phenomena known as false tripping. Where a monitoring current is provided in a ground line, with a receiver or relay or the like sensing the monitoring current, oftentimes a shunt parallel ground circuit from the machine or load back to ground at the power source will drain off sufficient current so that the relay or receiver generator an open circuit ground conductor alarm or actuates a circuit breaker. This occurs despite the fact that there is no problem in the ground conductor. This can occur for example when a second mining machine's frame is touching the frame of the one being monitored, thereby creating a parallel ground path back to ground at the load. Some prior art arrangements have been concerned with this problem of false tripping, but have attempted to solve it by connecting various additional devices in series with the ground conductor, thereby creating other problems.

OBJECTS AND SUMMARY OF THE INVENTION

It is an object of this invention to provide a system and method for monitoring continuity of a ground conductor.

It is a more specific object of this invention to provide such a system and method which consumes a small amount of power and is not subject to unreliable operation due to alternate conduction paths being established.

Briefly, in accordance with one embodiment of the invention there is provided a monitoring system for use with a power transmission system including a power source and a load and a plurality of power transmission cables extending between the power source and the load and further including a ground conductor extending between the source and the load. The monitoring system monitors electrical continuity of the ground conductor and includes a transmitter for transmitting an audio signal over the ground conductor. A receiver is coupled to the ground conductor for continuously receiving the audio signal. An alarm device is associated with and actuated by the receiver to provide an indication when the receiver no longer receives the audio signal. Both the transmitter and receiver are coupled to signal lines through a closed inductive circuit (toroid) so as to preclude the possibility of alternate conducting paths being established.

BRIEF DESCRIPTION OF THE DRAWINGS

FIG. 1A is a schematic diagram of one embodiment of a power transmission system including the monitoring system of the present invention.

FIG. 2 is a schematic circuit diagram of one embodiment of a transmitter for use in the system of FIG. 1.

FIG. 4 is a schematic diagram of a preferred embodiment of a power transmission system including the monitoring system of the present invention wherein a pilot conductor is used and the transmitter and receiver toroids are both coupled to the ground conductor.

FIG. 5 is a schematic diagram of another preferred embodiment of a power transmission system including the monitoring system of the present invention wherein the power conductors are used as a return conducting path and wherein the transmitter and receiver toroids are both coupled to the ground conductor.

DESCRIPTION OF THE PREFERRED EMBODIMENT

Figure 1B:
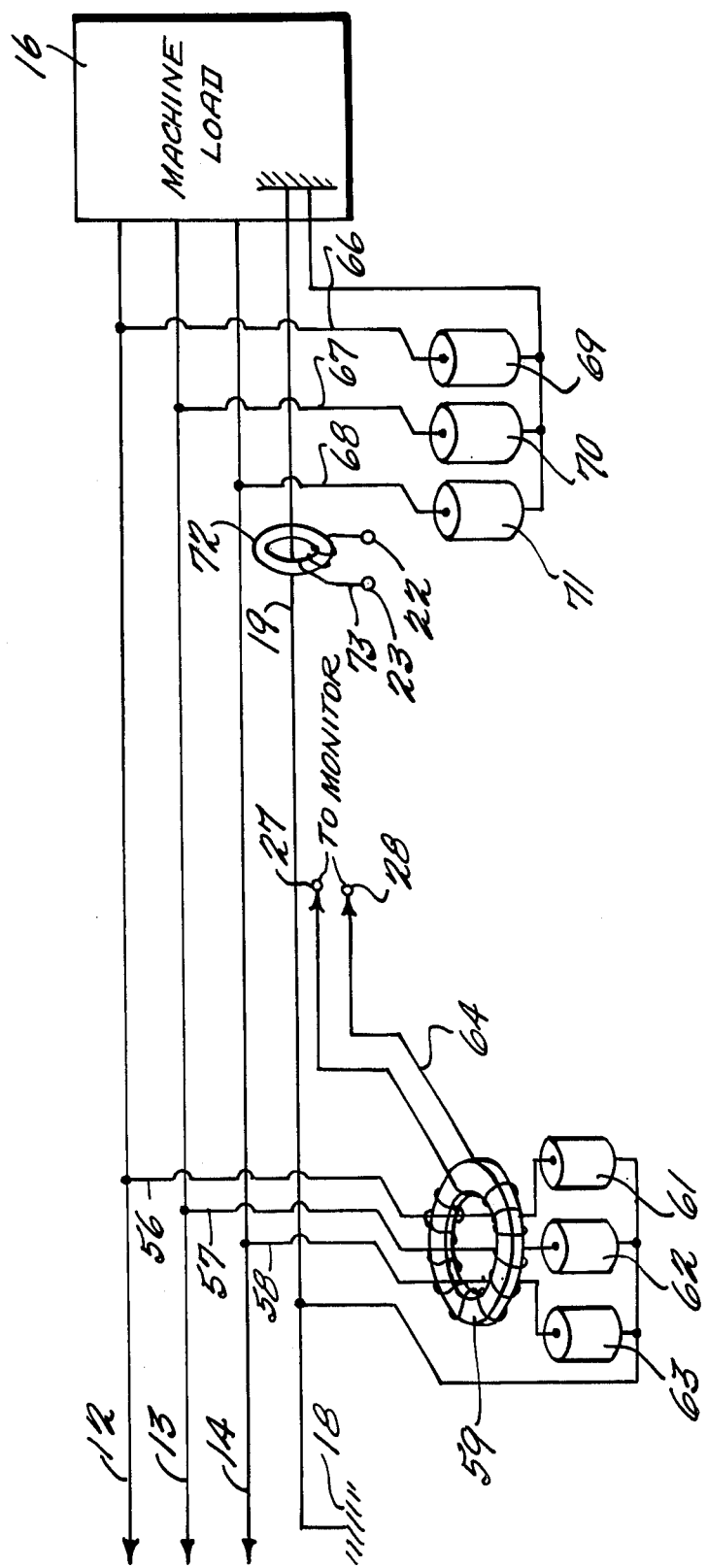
FIG. 1B is a schematic diagram of an alternate embodiment of a power transmission including the monitoring system of the present invention.

FIG. 1A is a schematic diagram of a power distribution system such as used, for example, in coupling power into a mine. In FIG. 1A a power source 11, which as illustrated may be a 3 phase Y-connected power source, is coupled over a plurality of power transmission cables 12, 13 and 14 to a load 16, which in the case of mining applications may be mining machines. As shown in FIG. 1A, a circuit breaker 17 is interposed in the power transmission cables 12, 13 and 14 adjacent the power source 11. The power source 11 has a ground connection through a resistance 17a to a ground indicated by reference numeral 18 which may be a grid buried in the earth. A ground conductor 19 is connected to the ground 18 and extends along with the power transmission cables to the load 16. The distance separating the power source 11 and the load 16 can vary widely from a few hundred feet to several miles.

In the embodiment of FIG. 1A a transmitter 21 is provided in association with the load 16. The transmitter 21 has two output terminals 22 and 23. The output terminals 22 and 23 are connected to a loop 15 wound around a ferromagnetic toroid 20 which completely encircles the ground conductor 19. This forms a closed inductive coupling.

A receiver 26 is provided in the embodiment shown in FIG. 1A. The receiver 26 has a pair of input terminals 27 and 28 connected to a loop 25 wound around a ferromagnetic toroid 30 which completely encircles the pilot line 24. This also forms a closed inductive coupling. The receiver 26 also has a pair of output terminals 29 and 30. The output signals on terminals 29 and 30 can be utilized for signalling a circuit breaker actuator 35 for controlling the circuit breaker 17.

In operation, the transmitter 21 generates an audio signal which is coupled into the ground conductor 19 through toroid 20. The receiver 26 is coupled through toroid 30 to the pilot line 24 and receives the transmitter signal. As long as the receiver 26 receives this audio signal, which is indicative of continuity of the ground conductor 19, the receiver generates appropriate outputs on output terminals 29 and 30 for keeping the circuit breaker actuator 35 unoperated so that the power source 11 is coupled to the load 16. When, however, the receiver 26 no longer receives the audio signal from transmitter 21, which corresponds to an interruption in the continuity of the ground conductor 19, appropriate signals are generated on output terminals 29 and 30 for activating the actuator 35 for tripping the circuit breaker 17 so as to disconnect the power source 11 from the load 16.

It is necessary that there be two conducting paths between the transmitter 21 and the recceiver 26. In accordance with the particular embodiment of the invention shown in FIG. 1, the ground conductor 19 comprises one of the conduction paths and a pilot line 24 comprises the other conduction path. Inasmuch as the transmitter and receiver are coupled into these two conducting paths through closed inductive circuits comprising toroids 20 and 30, there is no possibility of the transmitter signal being coupled to the receiver over any parallel paths through the earth. The ground conductor 19 must be intact for the receiver 26 to receive the transmitter signal.

In the specific embodiment illustrated in FIG. 1A, the transmitter 21 is illustrated as being associated with (physically located) adjacent the load and the receiver 26 is illustrated as being associated with (physically located) adjacent the power source. Both the transmitter and receiver can alternatively be located at the power source or both can be located at the load. As more fully discussed hereinafter, if one is not concerned about false tripping, then one toroid can be coupled to the pilot line and one to the ground conductor, as illustrated.

FIG. 1B is a schematic diagram of an alternate embodiment of a monitoring system in accordance with the invention. In the embodiment of FIG. 1B no separate pilot line is provided. Rather, the three-phase power conductors 12, 13 and 14 are themselves used as one signal path for the monitoring system. Thus in FIG. 1B circuits 56, 57 and 58 are respectively connected at one end to the three phase power conductors 12, 13 and 14 and are looped around a toroid 59 and through termination capacitors 61, 62 and 63 to ground 18. A conductor 64 is also looped around the toroid 59 and is connected to terminals 27 and 28 (to which the receiver 26 is connected).

At the load end of the power system, circuits 66, 67 and 68 are respectively connected at one end to the three phase power conductors 12, 13 and 14 and are coupled through termination capacitors 69, 70 and 71 to machine ground (to which the ground conductor 19 is connected). A toroid 72 surrounds the ground conductor 19 and a conductor 73 is wound around the toroid 72. The conductor 73 is connected to terminals 22 and 23 (to which the transmitter 21 is connected).

With the arrangement of FIG. 1B signals from the transmitter are coupled through terminals 22 and 23 and conductor 73 and toroid 72 into the ground conductor 19. The three phase power conductors 12, 13 and 14 are coupled to either end of the ground conductor 19 through the termination capacitors 61, 62 and 63, and 69, 70 and 71. By means of toroid 59 the three phase power conductors are coupled to terminals 27 and 28 to which the receiver is connected. The two signal paths between the receiver and transmitter are thus provided by the power conductors and by the ground conductor. Since the receiver and transmitter are coupled to these signal paths through closed inductive circuits, i.e., toroids 59 and 72, there is no possibility that an alternate parallel path could be established through the earth between the transmitter and receiver. Again, the receiver and/or the transmitter can be located anywhere along the two signal paths as long as there is no concern about the possibility of false tripping.

An important aspect of the invention is the characteristic of the signal transmitted by the transmitter over the ground conductor 19 to the receiver. As mentioned previously, D.C. signals have been coupled over a ground conductor in a power distribution system for monitoring continuity of the ground conductor. Such a DC system is subject to the disadvantages mentioned hereinbefore. In accordance with the invention, the signal coupled over the ground conductor from the transmitter to the receiver is a signal lying within the audio range. For an audio signal having a frequency within the range, for example, 1,000–8,000 Hz, the earth presents a substantial resistance or impedance, even in the presence of mineral deposits. For a signal of say 1,500 Hz, the earth presents an impedance on the order of several thousands of ohms, 6,000 ohms, for example. One parameter governing selection of a particular frequency for the audio signal has to do with applications of the monitoring system of this invention to applications such as mining. It should be appreciated that in mining applications the machine or load 16 is not always a constant distance from the power source 11, but that the distance varies as the machine is moved further into a mine. Thus, the power cables 12, 13 and 14 have portions thereof rolled up on spools or the like so that the cables may be unwound as the machine or load 16 is moved further into a mine. The ground conductor 19 and the pilot line 24 if one is used are also rolled up on spools so that the spools may be unwound as the machine or load 16 is moved further into a mine. If the monitoring audio signal applied to the ground conductor 19 and the pilot line 24 are of too high a frequency, inductive effects due to them being wound on a spool are likely to occur. It is therefore necessary that the frequency of the audio signal be kept below a frequency at which inductive effects would cause erroneous indications or otherwise detract from the performance of the monitoring system. It has been found that a suitable frequency for the audio signal utilized in the monitoring system of the present invention is an audio signal having a frequency of 1,500 Hz. The exact frequency is, of course, not critical and audio frequencies of from say 1,000 Hz to 8,000 Hz are also quite satisfactory.

Turning now to a consideration of FIG. 2, there is shown a detailed circuit diagram of the transmitter 21 of FIG. 1 in accordance with one embodiment suitable for use in the system and method of this invention. In FIG. 2 a power source 27, such as 110 volts AC, is coupled through one side S1a of a double pole switch S1 across the primary of a transformer T1. The secondary of transformer T1 is connected across a full wave rectifier bridge BR1. The bridge output is connected across a filtering capacitor C1, with the negative output being connected to a conductor 28 and the positive output being connected through a current limiting resistor R1 to a terminal 29. A battery B1 is connected between the conductor 28 and the terminal 29. The other pole S1b of the two pole switch S1 connects the terminal 29 to a terminal 31. An indicator lamp L1 is connected between the terminal 31 and the conductor 28 to serve as an indication that the transmitter 21 is on. Terminal 31 is connected through a current limiting resistor R2 to a terminal 32. A filtering capacitor C2 is connected between the terminal 32 and conductor 28 and a zener diode D1 is also connected between the terminal 32 and the conductor 28.

Terminal 32 is connected directly to a center tapped primary winding of a transformer T2 and also connected through a resistor R3 to a terminal 33. Terminal 33 is connected to the conductor 28 through a resistor R4 and also through a parallel capacitor C3.

A transistor Q1 is provided which has its collector connected to one end of the center tapped primary winding of transformer T2 and its emitter connected to the conductor 28. An additional transistor Q2 is provided which has its collector connected to the opposite end of the center tapped primary winding of transformer T2 and its emitter also connected to conductor 28. The base of transistor Q1 is connected through a parallel circuit consisting of a resistor R5 and a capacitor C4 and through a biasing primary winding 34 of transformer T2 to the terminal 33. Similarly, the base of transistor Q2 is connected through a parallel circuit consisting of resistor R6 and capacitor C5 and through a biasing primary winding 36 to the terminal 33.

The secondary winding of transformer T2 has a series combination of a lamp L2 and a push-button switch S2 connected thereacross for purposes of testing the transmitter. One end of the secondary winding is connected to the output terminal 22 and the other end of the secondary winding is connected through a capacitor C6 and a resistor R7 to the output terminal 23.

In operation, the secondary winding of the transformer T1 supplies power through the full wave bridge rectifier BR1 to the battery B1. Capacitor C1 is used as a filter and resistor R1 is used for limiting the current flow to the battery B1 and to the remainder of the circuits through the second set of S1 contacts, S1b. Lamp L1 provides an indication of the transmitter operating. The purpose of having the battery B1 which is charged through the full wave bridge rectifier BR1 is to insure being able to provide power to the transmitter in the event of a failure of the power source 27. That is, the transmitter 21 will be disposed adjacent a machine or load in a mine and if for some reason the continuity of the ground conductor is interrupted, as more fully described hereinafter, the receiver of the present system activates an actuator to trip a circuit breaker which cuts or shuts off the power into the mine. The circuit breaker will not be reset until the receiver picks up a signal from the transmitter indicating that continuity of the ground conductor has been restored. Thus, in order to engage the breaker in accordance with one embodiment of the invention, it is necessary that the transmitter be operating. While the breaker disengaged power would not be available from the power source 27 shown in FIG. 2 and thus the battery B1 insures that the transmitter can be restarted so as to restore power into the mine.

Resistor R2 regulates current from the battery B1 into the remainder of the transmitter. Capacitor C2 provides further filtering and zener diode D1 functions as a voltage regulator.

When switch S1 is closed, the emitters of transistors Q1 and Q2 are made negative. The collectors of transistors Q1 and Q2 are made positive through the center tapped primary winding of transformer T2. As voltage builds up on the capacitors C4 and C5 in the base circuits of the transistors Q1 and Q2, the current flow to the bases of the transistors Q1 and Q2 increases through the resistors R5 and R6 until the point is reached where transistors Q1 and Q2 are biased on and become conductive. This allows a current flow in both directions of the center tapped primary winding of the transformer T2. As the current flow increases through the center tapped winding of the transformer T2, a voltage is induced into the secondary winding of transformer T2, and a counter-voltage to the impressed voltage is induced into the two biasing windings 34 and 36 through which transistors Q1 and Q2 are biased. This counter-voltage opposes the impressed voltage and transistors Q1 and Q2 become reversed biased. The turning off of transistors Q1 and Q2 causes a field collapse across the secondary of transformer T2 and induces the second half of a sine wave in the secondary of transformer T2. The arrangement of transistors Q1 and Q2 together with the windings of transformer T2 thus functions as an oscillator. The lamp L2 and the push-button S2 are for the purpose of testing the device. Closing the switch S2 puts a light load across the output of the transformer T2. If the unit is not operating there will be no indication at lamp L2 whereas there will be if the unit is operating properly.

As mentioned previously, in accordance with one specific embodiment of the invention, the transmitter 21 of FIG. 2 is designed to generate an audio output signal at terminals 22 and 23 having a frequency of 1,500 Hz. The frequency of the output of the transmitter 21 is adjustable by regulating the values of capacitors C3, C4 and C5. In accordance with one particular embodiment of the invention, the values of the various components shown in the transmitter circuit in FIG. 2 are as follows:

R1 — 50 ohms
R2 — 30 ohms
R3 — 750 ohms
R4 — 220 ohms
R5 — 100 ohms
R6 — 100 ohms
R7 — 270 ohms
Q1, Q2 — 2N5190
C1 — 300 $\mu f$
C2 — 400 $\mu f$
C3 — 22 $\mu f$
C4 — 0.1 $\mu f$
C5 — 0.1 $\mu f$
C6 — 1 $\mu f$
D1 — 1N5333

With these specific components and circuitry the transmitter output is a continuous 1,500 Hz audio tone having a signal strength of approximately 2 milliamps at 10.8 volts. Thus it can be seen that power consumption of the transmitter in accordance with the invention is minimal.

Figure 3:
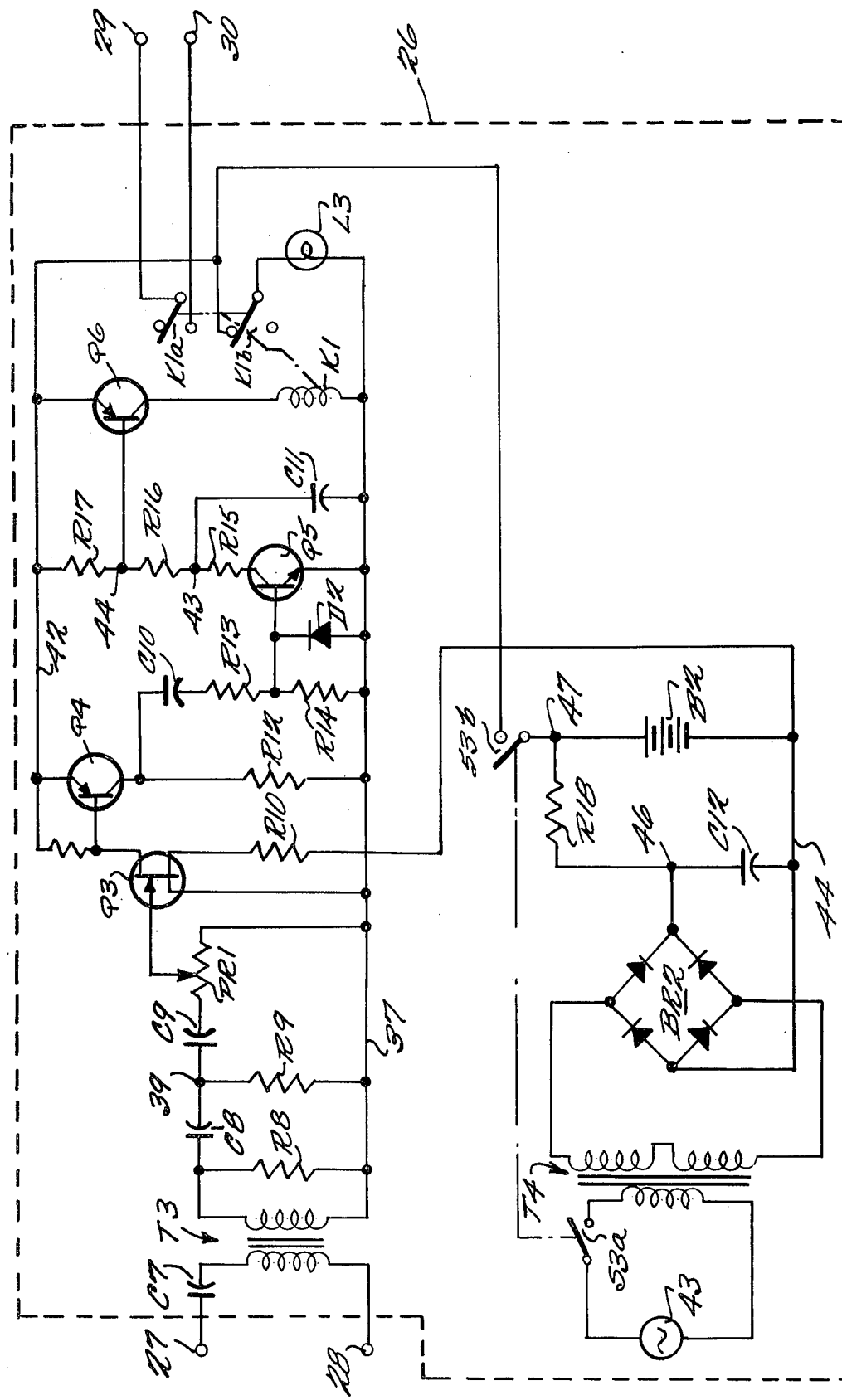
FIG. 3 is a schematic circuit diagram of a suitable receiver for use in the monitoring system of FIG. 1.

In the receiver 26 of FIG. 3 the input terminals 27 and 28 are coupled through a capacitor C7 to the primary winding of a transformer T3. The secondary winding of transformer T3 has one end connected to a conductor 37 and the other end connected to a terminal 38. A resistor R8 is connected between terminal 38 and the conductor 37 and a capacitor C8 is connected between the terminal 38 and a terminal 39. A resistor R9 is connected between the terminal 39 and conductor 37 and a series combination of a capacitor C9 and a potentiometer PR1 are connected between the terminal 39 and conductor 37. The wiper of potentiometer PR1 forms the input to an FET transistor Q3 whose case is connected via a conductor 41 to the conductor 37. One of the source or drain terminals of FET transistor Q3 is connected through a resistor R10 to conductor 37 and the other of the source or drain terminals is connected to the base of a transistor Q4. A resistor R11 is connected between the base and emitter of transistor Q4 for providing biasing. The collector of transistor Q4 is connected through the resistor R12 to conductor 37. The collector of transistor Q4 is also connected through a coupling capacitor C10 and a limiting resistor R13 to the base of a transistor Q5. A resistor R14 and diode D2 are connected in parallel with each other between the base of transistor Q5 and conductor 37. The emitter of transistor Q4 is connected to a conductor 42 and the emitter of transistor Q5 is connected to the conductor 37. The collector of transistor Q5 is connected through a resistor R15 to a terminal 43; terminal 43 is connected through a resistor R16 to a terminal 44; and terminal 44 is connected to a resistor R17 to the conductor 42. A capacitor C11 is connected between terminal 43 and conductor 37. A transistor Q6 has its base connected to terminal 44; its emitter connected to conductor 42; and its collector connected through a relay coil K1 to the conductor 37.

The relay K1 has two sets of contacts, K1a and K1b associated therewith. The set of contacts K1a serve as a switch for disconnecting the output terminals 29 and 30 from one another while the relay K1 is actuated and for connecting the output terminals 29 and 30 to each other when the relay K1 is not actuated. This switching action can serve as a control function for operating a circuit breaker, for example. The set of contacts K1b apply power to an indicator lamp L3 when the relay K1 is actuated with the lighting of lamp L3 serving as an indication that the receiver 26 is receiving a signal. When the relay K1 is not actuated, the set of contacts K1b disconnect the lamp L3 from a power source with the failure of lamp L3 to be lighted, serving as an indication that the receiver 26 is not receiving an input signal.

The receiver 26 also includes suitable circuitry for deriving power for powering the receiver. A power source 43 which may be, for example, 110 volts AC is coupled through one pole S3a of a two pole switch to the primary of a transformer T4. The secondary of transformer T4 is connected across a full wave rectifier bridge BR2. The output of the full wave rectifier bridge BR2 is coupled across a capacitor C12 between a conductor 44 and a terminal 46. The terminal 46 is connected through a resistor R18 to a terminal 47 with a battery B2 being connected between the terminal 47 and the conductor 44. Conductor 44 is connected to conductor 37 and terminal 47 is connected through the second pole S3b of the two pole switch S3 to the conductor 42 and also the set of contracts K1b.

In operation, the input signal received at terminals 27 and 28 passes through a bandpass filter comprising resistors R8 and R9 and capacitors C8 and C9 and is coupled through the potentiometer PR1 into the low input impedance FET transistor Q3. The pass band of the bandpass filter is centered about the particular frequency of the monotoring signal being transmitted, which in the case of one particular embodiment of the invention is 1,500 Hz. Transistors Q4, Q5 and Q6 comprise amplifier stages for amplifying the received signal with the signal at the collector of transistor Q6 actuating the relay K1. Thus, with the arrangement shown in FIG. 3 for the receiver 26, the relay K1 is actuated as long as the input signal is present at the input terminals 27 and 28. While this input signal is present the output terminals 29 and 30 are disconnected from one another as shown by the position of the contacts K1a in FIG. 3. When the input signal is no longer present at the input terminals 27 and 28 such as would occur for an open circuit or discontinuity of a ground conductor, the transistor Q6 is not turned on and relay K2 is not actuated. With the relay K1 not actuated the output terminals 29 and 30 are connected to one another through the contacts K1a. The contacts K1a thus serve as a switch for connecting or not connecting the output terminals 29 and 30 to each other depending upon whether or not an input signal is being received at the input terminals 27 and 28.

Other receiver arrangements are, of course, possible and are contemplated as being within the scope of the method and system of this invention. However, in accordance with one particular embodiment of the invention, a receiver circuit comprises the specific circuitry shown in FIG. 3 with the components thereof having the following values:

R8 — 1 K ohms
R9 — 10 K ohms

R10 — 100 ohms
R11 — 2.2 K ohms
R12 — 1 K ohms
R13 — 1 K ohms
R14 — 2.2 K ohms
R15 — 220 ohms
R16 — 220 ohms
R17 — 2.2 K ohms
R18 — 24 ohms
PR1 — 100 K ohms
C7 — 1µf
C8 — .02µf
C9 — .002µf
C10 — 22µf
C11 — 22µf
C12 — 300µf
D2 — 1N4001
Q3 — 2N4220A
Q4 — 2N4126
Q5 — 2N4124
Q6 — MPS U-51

Thus, what has been thus far described is a method and system for monitoring the continuity of a ground conductor in a power distribution system. In accordance with the invention an audio tone within a particular frequency range is coupled from a transmsitter over the ground conductor to a receiver. The receiver continuously monitors the signal coupled over the ground conductor and is responsive to the absence of the signal, corresponding to discontinuity of the ground conductor, to actuate an alarm and/or actuate or trip a circuit breaker for disconnecting the power source from the load. The system and method of this invention can be adapted for monitoring continuity of any kind of conductor and is particularly advantageous for monitoring continuity of ground conductors in power distribution systems for distributing and coupling power into mines. Power distribution systems for coupling power into mines usually consist of a number of branches. A plurality of receiver and transmitter units in accordance with this invention may be employed with there thus being separate monitoring of the continuity of the ground conductor extending between every two adjacent intersections or branch points of a mine power distribution system. This arrangement has the advantage in that in the event of a discontinuity in the ground conductor in one of the branches of the power distribution system, only that particular branch is disconnected from the power source while power remains being supplied to the other branches of the power distribution system. Alternatively, one transmitter unit employed at a point in the power distribution system furthest from the power source may be utilized together with one receiver located at the power source with the ground conductors in each of the branches of the power distribution system connected in series with each other with the transmitted audio signal coupled over these series connected ground conductors to the receiver. With such a series connected arrangement, failure or discontinuity of the ground conductor at any point in the power distribution system results in shutdown of the entire power distribution system.

Turning now to FIGS. 4 and 5, there are illustrated preferred embodiments of the invention in which both the transmitter and receiver are coupled to the ground conductor by toroids encircling the ground conductor, as opposed to having one toroid encircle the ground conductor and another encircle the other conducting path (whether a pilot wire or the power supply conductors). As more fully explained hereinafter, such an arrangement provides monitoring of the ground conductor continuity without the possibility of being subjected to false trips as might result from low impedance shunt paths to ground at the load end. Such shunt paths might exist for example, if the frame of a second mining machine (grounded through a separate ground conductor) were touching the grounded frame of the machine whose ground connection is being monitored. If both the transmitter and receiver toroids are coupled to the ground conductor as in this preferred embodiment, the receiver will sense the monitoring current induced in the ground conductor, regardless of the existence of any shunt paths at either end of the ground conductor.

In FIGS. 4 and 5 the power distribution circuitry is the same as in FIGS. 1A and 1B respectively, and the same reference characters are applied. Thus in FIG. 4 there is a separate pilot line 24 extending between the power source ground and load ground in addition to the ground conductor 19. In the arrangement of FIG. 4, however, both a transmitter toroid 51 and a receiver toroid 52 are coupled to the ground conductor 19. As before, the transmitter toroid 51 is connected through terminals 22 and 23 to a transmitter 21, and the receiver toroid 52 is connected through terminals 27 and 28 to a receiver 26. Operation of the transmitter and receiver in this embodiment is the same as their operation in the embodiment illustrated in FIG. 1A. Additionally, since both the transmitter and receiver toroids encircle the ground conductor, there is no possibility of false tripping due to shunt paths for the monitoring signal. In the arrangement of FIG. 4 the transmitter and receiver toroids may both be located at the power source end of ground conductor 19 or both at the load end. Alternatively, one may be located at one end and the other at the opposite end.

In FIG. 5 an arrangement similar to that of FIG. 1B is illustrated, but in FIG. 5 both the receiver toroid 53 and transmitter toroid 54 encircle the ground conductor. Again, this arrangement prevents false tripping due to shunt circuits which may be present at either end of the ground conductor. In the same manner as FIG. 4, the transmitter and receiver toroids in FIG. 5 may be located anywhere along the ground conductor 19.

Although the method and system of this invention has been described with reference to particular preferred embodiments, arrangements other than that particularly disclosed in the specification and drawings can be made by those skilled in the art without departing from the true spirit and scope of the invention. The invention is equally applicable to DC or AC power distribution systems and the second signal path other than the ground conductor for the audio signal can be one of the power supply conductors rather than a pilot line. Similarly, the system and method of this invention can be used as a remote control; that is, the conductivity of the ground conductor can be purposefully interrupted so as to disconnect the power source by means such as actuating or tripping a circuit breaker. These and other similar modifications are contemplated as being within the scope of the present invention.

We claim:
1. In a power transmission system including a power source and a load and a plurality of power transmission cables extending between the power source and the load and further including a continuous, uninterrupted ground conductor extending between the source and load, and being directly connected to the source ground and directly connected to frame ground of the load, a monitoring system for monitoring electrical continuity of the ground conductor comprising a transmitter for transmitting a signal having a predetermined frequency within the audio range over the ground conductor, said transmitter signal being coupled to the ground conductor only through a closed inductive system comprising a first toroid surrounding said ground conductor, a receiver, said receiver being coupled to the ground conductor only through an additional closed inductive system comprising a second toroid surrounding said ground conductor and functioning to continuously receive said signal being carried over the ground conductor, said closed inductive system of said first and second toroids forming a closed system for monitoring continuity of said ground conductor so that possible parallel conductive paths which may extend from frame ground of the load to source ground cannot couple any signal to said receiver from said transmitter if said ground conductor is broken or open circuited, and whereby such possible parallel paths will not have any shunting effect on the receiver signal if the ground conductor is not open-circuited, and an alarm device associated with and actuated by said receiver to provide an indication when said revceiver no longer receives said signal, thereby indicating that an open circuit or high impedance condition exists in said ground conductor.

2. A monitoring system in accordance with claim 1, wherein an additional signal path besides said ground conductor is provided between the source and load with the additional signal path being coupled to said ground conductor both at the source and the load, and wherein both said transmitter and said receiver are coupled through said first and second toroids, respectively, to said ground conductor.

3. A monitoring system in accordance with claim 2, wherein said additional signal path comprises a pilot line.

4. A monitoring system in accordance with claim 2, wherein said additional signal path comprises the power transmissioner cables, and including signal coupling capacitors coupling the power transmission cables to ground both at the power source end and the load end thereof.

5. A monitoring system in accordance with claim 1, including an actuator and a circuit breaker interposed in the power transmission cables, said circuit breaker actuated to an open or tripped position by said actuator in response to an indication that said ground conductor is open circuited or has a high impedance.

6. A method for monitoring continuity of a continuous, uninterrupted conductor extending between a power source and a load without directly connecting anything to the conductor to disturb its integrity comprising the steps of generating a continuous signal within the audio range, coupling the audio signal to the conductor through a first closed inductive system, and coupling a receiver to the conductor through a second closed inductive system whereby reception of the audio signal by the receiver is an indication of the continuity of the conductor and parallel conductive paths cannot couple any signal from the transmitter to the receiver to provide any erroneous indication of conductor continuity, and such parallel conductive paths cannot shunt the audio signal away from the receiver so as to provide any erroneous indication of conductor discontinuity.

* * * * *